United States Patent
Luo et al.

(10) Patent No.: US 7,960,488 B2
(45) Date of Patent: Jun. 14, 2011

(54) ALUMINOXANE COMPOSITIONS, THEIR PREPARATION, AND THEIR USE IN CATALYSIS

(75) Inventors: Lubin Luo, Baton Rouge, LA (US); Samuel A. Sangokoya, Baton Rouge, LA (US); Jamie R. Strickler, Baton Rouge, LA (US); Steven P. Diefenbach, Baton Rouge, LA (US)

(73) Assignee: Albemarle Corporation, Baton Rouge, LA (US)

( * ) Notice: Subject to any disclaimer, the term of this patent is extended or adjusted under 35 U.S.C. 154(b) by 0 days.

(21) Appl. No.: 12/299,555

(22) PCT Filed: May 2, 2007

(86) PCT No.: PCT/US2007/067983
§ 371 (c)(1),
(2), (4) Date: Nov. 4, 2008

(87) PCT Pub. No.: WO2007/131010
PCT Pub. Date: Nov. 15, 2007

(65) Prior Publication Data
US 2009/0088541 A1    Apr. 2, 2009

Related U.S. Application Data

(60) Provisional application No. 60/798,074, filed on May 4, 2006.

(51) Int. Cl.
*C08F 4/52*    (2006.01)
(52) U.S. Cl. ...................................................... 526/160
(58) Field of Classification Search .................. 526/160
See application file for complete search history.

(56) References Cited

U.S. PATENT DOCUMENTS

| | | |
|---|---|---|
| 6,710,005 B1 | 3/2004 | Guo et al. |
| 2002/0035029 A1* | 3/2002 | Yoshida et al. ............... 502/154 |
| 2002/0082369 A1 | 6/2002 | Holtcamp |
| 2005/0143254 A1 | 6/2005 | Sangokoya et al. |

FOREIGN PATENT DOCUMENTS

| | | |
|---|---|---|
| DE | 44 26 122 A1 | 2/1995 |
| WO | WO 2004/022571 A1 | 3/2004 |

* cited by examiner

*Primary Examiner* — Ling-Siu Choi
*Assistant Examiner* — Sonya Wright
(74) *Attorney, Agent, or Firm* — James A. Jubinsky

(57) ABSTRACT

Aluminoxane compositions derived from aluminoxane source, halogen source, and Lewis base are provided. Such compositions are useful for activating catalysts for olefin polymerization.

19 Claims, No Drawings

ALUMINOXANE COMPOSITIONS, THEIR PREPARATION, AND THEIR USE IN CATALYSIS

FIELD OF THE INVENTION

This invention relates to aluminoxane compositions that are of utility in formation of catalyst systems, to methods for the preparation of these aluminoxane compositions and catalyst systems, and to the use of such catalyst systems in the polymerization of olefin monomers, dienes, or the like.

BACKGROUND

Aluminoxane compositions are widely used in combination with various types of metallocenes and transition metal compounds to prepare catalyst systems for polymerizing olefin monomers. However, certain limitations are associated with standard aluminoxane solutions, such as poor solubility, instability, and gel formation. For example, solutions of conventional aluminoxanes, such as methylaluminoxane (MAO), must be kept at lower temperatures to inhibit degradation via irreversible gel formation.

Addition of small amounts of halogen to conventional aluminoxanes has been shown to impart a higher stability to precipitation, i.e., gel formation, at ambient and elevated temperatures. See, for example, US 2005 0143254 (publication of Ser. No. 10/751,144 filed 31 Dec. 2004). Gel formation is undesirable because if causes the aluminoxane to be difficult to handle. For example, whereas liquid aluminoxanes can be readily transferred from container to reactor via tubing, transfer of a gel from container to reactor can be challenging and time consuming.

While aluminoxanes with halogen added are generally more stable to precipitation than standard aluminoxanes, they are still nonetheless susceptible to some precipitation at room temperature (about 20° C.) and higher temperatures.

It is therefore desirable to provide aluminoxane compositions that have greater solubility at lower temperatures and are resistant to irreversible precipitation at higher temperatures.

SUMMARY OF THE INVENTION

The present invention provides aluminoxane compositions useful as activators with transition metal components in catalyzing the polymerisation of olefins. Aluminoxane compositions according to this invention comprise aluminoxane, halogen source, and Lewis base. Further details of the present invention are provided in the detailed description.

DETAILED DESCRIPTION OF THE INVENTION

Provided by this invention is composition derived from at least; a) aluminoxane source; b) halogen source; and c) Lewis base. The aluminoxane source can comprise methylaluminoxane. The halogen source can comprise fluorine source. The Lewis base can comprise one or more of multi-dentate donor and mono-dentate donor, including mixtures or combinations thereof; multi-dentate donor can comprise, e.g., siloxane; mono-dentate donor can comprise, e.g., $NR^2_3$, wherein each $R^2$ is independently hydrogen atom or hydrocarbyl group having up to about 24 carbon atoms. Further, this invention provides composition derived from at least: a) aluminoxane source comprising about 0.5 mol % to about 30 mol % halogen atoms relative to Al atoms; and b) Lewis base. Aluminoxane source can comprise about 0.5 mol % to about 15 mol % halogen atoms relative to Al atoms. Aluminoxane source can comprise about 0.8 mol % to about 15 mol %, or about 4.7 mol %, halogen atoms relative to Al atoms. When the halogen source is dimethylaluminum fluoride, it can comprise up to about 30 mol % halogen atoms relative to Al atoms; when the halogen source is alpha,alpha,alpha-trifluorotoluene (TFT), it can comprise up to about 8 mol % halogen atoms relative to Al atoms. Compositions according to this invention can comprise about 0.5 mol % to about 15 mol % donor atoms from Lewis base relative to aluminum atoms. Also provided is composition derived from at least: a) aluminoxane source; and b) Lewis base that is also halogen source. In compositions of this Invention, Lewis base can comprise (i) $NMeR^2_2$, wherein each $R^2$ is independently hydrogen atom or hydrocarbyl group having up to about 24 carbon atoms, or (ii) OMTS, or combinations of (i) and (ii).

Also provided by this invention is method of preparing composition comprising combining at least a) aluminoxane source; b) halogen source; and c) Lewis base. The halogen source can comprise fluorine source. Also provided is method of preparing composition comprising combining at least: a) aluminoxane source comprising up to about 30 mol % fluorine atoms relative to aluminum atoms; and b) Lewis base.

Also provided is method of polymerizing monomer comprising combining composition of this Invention, transition metal component, and monomer.

(A) Aluminoxane Source

Aluminoxane source (A) can comprise any aluminoxane, including without limitation methylaluminoxane (MAO), ethylaluminoxane (EAO), isobutylaluminoxane (IBAO), other aluminoxanes, and combinations thereof, MAO may be derived from $AlMe_3$ and wafer; EAO may be derived from $AlEt_3$ and water; IBAO may be derived from $Al^iBu_3$ and water.

(B) Halogen Source

Halogen source (B) can comprise any halogen source, for example fluorine source, chlorine source, or bromine source. Halogen source (B) can comprise Lewis base. As used herein, halogen source can refer to halogen atom in the negative state, generally referred to as halide ion, e.g., $F^-$, $Cl^-$, $Br^-$. The term "halogen source" is commonly used in the art describe such halide ions.

Halogen source (B) can comprise fluorine source, for example, alpha,alpha,alpha-trifluorotoluene.

One type of halogenation agent that can be used to form aluminoxane composition of this invention is a halohydrocarbon of the formula $R_nCX_{4-n}$, where n=1–3, X is, independently, fluorine, chlorine or bromine, and where R is, independently, a hydrogen atom or a hydrocarbyl group having from one to about twenty carbon atoms. R can be a straight chain, branched, cycloalkyl, aryl, or araalkyl group. When only one R is a hydrocarbyl group, the hydrocarbyl group can be an aryl group, in halohydrocarbons in which all R are hydrogen atoms, such halohydrocarbons tend to react slowly with aluminoxane, and frequently the reaction does not go to completion, i.e., the yields can be low.

A suitable type of halohydrocarbon is a tertiary halohydrocarbon: another suitable type of halohydrocarbon is that in which at least one R is an aryl group. Secondary and primary halohydrocarbons appear to provide less stability to the believed cationic species of the ionic aluminoxane complexes, or to the intermediate in the formation of the partially halogenated aluminoxane.

Another suitable type of halohydrocarbon is one in which at least one R is an aryl group, e.g., a phenyl group. When at least one R is an aryl group, the halohydrocarbon can be a primary halohydrocarbon in which one R is an aryl group and the other R(s) are hydrogen atoms, or all of the other substituents are halogen atoms. This group of halohydrocarbons can be represented by the formula:

$$ArG_n$$

where Ar is an aromatic hydrocarbon ring system, which typically contains up to about 25 carbon atoms, or up to about 12 carbon atoms, or 6 carbon atoms in the ring system (i.e., excluding X and excluding any substituents that may be present on the ring(s)); G is —$CX_3$, —$CX_2R$, or —$CXR_2$, in which X is, independently, a fluorine atom, chlorine atom, or bromine atom, and in which R is, independently, a hydrogen atom or C-m alkyl group; and n is 1 to 5, or 1 to 3, or 1 or 2, G can be a trihalomethyl group.

When there are substituents on the aromatic ring(s) other than hydrogen and the group(s) containing labile halogen atom(s), these other such substituents can be electron-donating substituents. Halogenation agents containing aromatic groups having electron-withdrawing substituents on the ring, such as fluorine, were observed to have slower reaction rates than halogenation agents with aromatic groups having only hydrogen atoms as substituents. In turn, halogenation agents containing aromatic groups having electron-donating substituents were observed to have faster reaction rates than halogenaton agents in which there were only hydrogen atoms on the aromatic ring. Typical electron-donating substituents include hydrocarbyloxy groups and hydrocarbyl groups.

Suitable halohydrocarbons having an aryl group include alpha,alpha,alpha-trifluorotoluene, alpha,alpha-difluorotoluene, alpha-fluorotoluene, octafluorotoluene, 1,2-di(fluoromethyl)benzene, 1,3-di(fluoromethyl)benzene, 1,4-di(fluoromethyl)benzene, 1,2-bis(difluoromethyl)benzenes 1,3-bis(difluoromethyl benzene, 1,4-bis(difluoromethyl)benzene, 1,3-bis(trifluoromethyl)benzene, 1,3,5-tris(trifluoromethyl)benzene, 4-methyl-1-(trifluoromethyl)benzene, 3-methyl-1-(trifluoromethyl)benzene, 1,3-bis(trifluoromethyl)-4-methylbenzene, 1,4-bis(trifluoromethyl)-2-methylbenzene, 1-ethyl-3,5-bis(trifluoromethyl)benzene, 1-isopropyl-4-(trifluoromethyl)benzene, 1-(fluoromethyl)-4-fluoro-2-(trifluoromethyl)benzene, 1-(fluoromethyl)-2,4-bis(trifluoromethyl)benzene, 1-(1-fluoroethyl)benzene, 1,2-difluoroethylbenzene, 3,3'-bis(trifluoromethyl)biphenyl, 4,4'-bis(trifluoromethyl)biphenyl; 2,2'-bis(fluoromethyl)biphenyl, 3-(difluoromethyl)biphenyl, 1-(trifluoromethyl)naphthalene, 2-(trifluoromethyl)naphthalene, 1-(difluoromethyl)naphthalene, 2-(difluoromethyl)naphthalene 1-(fluoromethyl)naphthalene, 1,8-bis(fluoromethyl)naphthalene, 1-(fluoromethyl)-2-(methyl)naphthalene, 1-isobutyl-2-trifluoromethyl-naphthalene, 1-methyl-4-trifluoromethyl-naphthalene, 1-n-butyl-5-trifluoromethyl-naphthalene, 1-(trifluoromethyl)anthracene, 2-(difluoromethyl)anthracene, 9-(trifluoromethyl)anthracene, 9,10-bis(trifluoromethyl)anthracene, 9-(trifluoromethyl)phenanthrene, triphenylfluoromethane, difluorodiphenylmethane, α,α,α-trichlorotoluene, α,α-dichlorotoluene, α-chlorotoluene, 1,3-bis(trichloromethyl)-4-methylbenzene, 1,4-bis(trichloromethyl)-2-methylbenzene, 4-methyl-1-(trichloromethyl)benzene, 3-methyl-1-(trichloromethyl)benzene, octachlorotoluene, 1,2-di(chloromethyl)benzene, 1,2-di(chloromethyl)benzene, 1,4-di(chloromethyl)benzene, 1,3,5-tris(trichloromethyl)benzene, 1-ethyl-3,5-bis(trichloromethyl)benzene, 1-isopropyl-4-tris(chloromethyl)benzene, 1-(chloromethyl)-4-chloro-2-(trichloromethyl)benzene, 1-(chloromethyl)-2,4-bis(trichloromethyl)benzene, 1-(1-chloroethyl)benzene, 1,2-dichloroethylbenzene, 3,3'-bis(trichloromethyl)biphenyl, 4,4'-bis(trichloromethyl)biphenyl, 2,2'-bis(trichloromethyl)biphenyl, 3-(dichloromethyl)naphthenyl 1-(trichloromethyl)naphthalene, 2-(trichloromethyl)naphthalene, 1-(dichloromethyl)naphthalene, 2-(dichloromethyl)naphthalene, 1-(chloromethyl)naphthalene, 1,8-bis(chloromethyl)napthalene, 1-(chloromethyl)-2-(methyl)naphthalene, 1-isobutyl-2-trichloromethyl-naphthalene, 1-methyl-4-trichloromethyl-naphthalene, 1-n-butyl-5-trichloromethyl-naphthalene, 1-(trichloromethyl)anthracene, 2-(dichloromethyl)anthracene, 9-(chloromethyl)anthracene, 9,10-bis(trichloromethyl)anthracene, 9-(trichloromethyl)phenanthrene, triphenylchloromethane, dichlorodiphenylmethane, α,α,α-tribromotoluene, α,α-dibromotoluene, α-bromotoluene, 1,2-di(bromomethyl)benzene, 1,3-di(bromomethyl)benzene, 1,4-di(bromomethyl)benzene, 1,3-bis(tribromomethyl)(benzene, 1,3,5-tris(tribromomethyl)-benzene, 4-methyl-1-(tribromomethyl)benzene, 3-methyl-1-(tribromomethyl)benzene, 1,3-bis(tribromomethyl)-4-methylbenzene, 1,4-bis(tribromomethyl)-2-methylbenzene, 1-ethyl-3,5-bis(tribromomethyl)benzene, 1-isopropyl-(tribromomethyl)benzene, 1-(bromomethyl)-2-(tribromomethyl)benzene, 1-(bromomethyl)-2,4-bis(tribromomethyl)benzene, 1-(1-bromoethyl)benzene, 1,2-dibromoethylbenzene, 3,3'-bis(tribromomethyl)biphenyl, 4,4'-bis(tribromomethyl)biphenyl, 2,2'-bis(bromomethyl)biphenyl, 3-(dibromomethyl)biphenyl, 1-(tribromomethyl)naphthalene, 2-(tribromomethyl)naphthalene, 1-(dibromomethyl)naphthalene, 2-(dibromomethyl)naphthalene, 1-(bromomethyl)naphthalene, 1,8-bis(bromomethyl)naphthalene, 1-(bromomethyl)-2-(methyl)naphthalene, 1-isobutyl-2-tribromomethyl-naphthalene, 1-methyl-4-tribromomethyl-naphthalene, 1-n-butyl-5-tribromomethyl-naphthalene, 1-(tribromomethyl)anthracene, 2-(dibromomethyl)anthracene, 9-(bromomethyl)anthracene, 9,10-bis(tribromomethyl)anthracene, 9-(tribromomethyl)phenanthrene, triphenylbromomethane, dibromodiphenylmethane, and the like. Mixtures of two or more of the foregoing halohydrocarbons may also be used.

Suitable halohydrocarbons which do not have an aryl group include tert-butyl fluoride (2-methyl-2-fluoropropane), 3-methyl-3-fluoropentane, 3-methyl-3-fluorohexane, 1-methyl-1-fluorocyclohexane, 1,3-difluoro-1,3,5-methylcyclooctane, 2-methyl-2-fluoroheptane, 1,2-difluoro-1-methylcyclooctane, 2-methyl-2-chloropropane, left-butyl chloride, 3-methyl-3-chloropentane, 3-chlorohexane, S-methyl-5-chlorohexane, 1-methyl-1-chlorocyclohexane, 1,3-dichloro-1,3,5-methylcyclooctane, 2-methyl-2-chloroheptane, 1,2-dichloro-1-methylcyclooctane, 2-methyl-2-bromopropane, tert-butyl bromide, 3-methyl-3-bromopentane, 2-bromohexane, 3-bromohexane, 3-methyl-3-bromohexane, 1-methyl-1-bromocyclohexane, 1,3-dibromo-1,3,5-methylcyclooctane, 2-methyl-2-bromoheptane, 1,2-dibromo-1-methylcyclooctane, and the like. Mixtures of two or of the foregoing halohydrocarbons may also be used.

Suitable halohydrocarbons which have at least two different elements of halogen that may be used include, but are not limited to, 1-chloro-3-fluoro-1,3,5-methylcyclooctane, 2-bromo-1-fluoro-1-methylcyclooctane, 2-chloro-1-fluoro-1-methylcyclooctane, 1-(trichloromethyl)-4-(trifluoromethyl)benzene, 1-(dichloromethyl)-3-(dibromomethyl)benzene, 1-(bromomethyl)-2-(fluoromethyl)benzene, 1-(chloromethyl)-4-(trifluoromethyl)benzene, 1-(dichloromethyl)-3-(fluoromethyl)benzene, 1-(bromomethyl)-3,5-bis(trifluoromethyl)benzene, 1-(chloromethyl)-3,5-bis(trifluoromethyl)benzene, 1-(tribromomethyl)-3-(trichloromethyl)-5-(trifluoromethyl)benzene, 1-ethyl-3-(trichloromethyl)-5-(trifluoromethyl)benzene, 1-(chloromethyl)-4-chloro-2-(tribromomethyl)benzene, 1-(fluoromethyl)-2,4-bis(trichloromethyl)benzene, 1-(1-bromoethyl)-3-(1-fluoroethyl)benzene, 1-(1,2-dichloromethyl)-4-(1-fluoroethyl)benzene, 1-trichloromethyl-4-trifluoromethyl-2,3,5,6-tetrachlorobenzene, 3-(trichloromethyl)-3'-(trifluoromethyl)biphenyl, 4-(dichloromethyl)-4'(difluoromethyl)-biphenyl, 2-(chloromethyl)-2'-(fluoromethyl)biphenyl, 1-(trichloromethyl)-2-(trifluoromethyl)naphthalene, 1-(difluoromethyl)-2-(dichloromethyl)naphthalene, 1-(bromomethyl)-8-(fluoromethyl)naphthalene, 9-(trifluoromethyl)-10-(trichloromethyl)anthracene, and the like. Mixtures of two or more of the foregoing halohydrocarbons may also be used.

Suitable halohydrocarbons are tert-butyl fluoride, tert-butyl chloride, tert-butyl bromide, alpha,alpha,alpha-trifluorotoluene, 4-methyl-1-(trifluoromethyl)benzene, 3-methyl-1-(trifluoromethyl)benzene, triphenylfluoromethane, alpha,alpha,alpha-trichlorotoluene, 4-methyl-1-(trichloromethyl)benzene, 3-methyl-1-(trichloromethyl)benzene, triphenylchloromethane, alpha,alpha,alpha-tribromotoluene, 4-methyl-1-(tribromomethyl)benzene, 3-methyl-1-(tribromomethyl)benzene, and triphenylbromomethane. Further suitable halohydrocarbons are alpha,alpha,alpha-trifluorotoluene, 4-methyl-1-(trifluoromethyl)benzene, alpha,alpha,alpha-trichlorotoluene, triphenylchloromethane, alpha,alpha,apha-tribromotoluene, and triphenylbromomethane. Additional suitable halohydrocarbons are alpha,alpha,alpha-trifluorotoluene, 4-methyl-1-(trifluoromethyl)benzene, triphenylchloromethane, and alpha,alpha,alpha-tribromotoluene.

Another type of halogenation agent that can be used to form aluminoxane composition of this invention is at least one siloxane having at least one labile halogen atom in the molecule, wherein each halogen atom is, independently, fluorine, chlorine, or bromine. The halogenation agent can comprise Lewis base, e.g., at least one siloxane having at least one labile halogen atom is Lewis base. These siloxanes have hydrocarbyl groups which can contain from about 1 to 30 carbon atoms and include linear and/or branched alkyl groups which contain from about 1 to 24 carbon atoms, cycloalkyl groups which contain from about 3 to 24 carbon atoms, and alkylaryl or aryl groups which contain from about 6 to 30 carbon atoms. At least one hydrocarbyl group of the siloxane contains at least one labile halogen atom. The siloxanes are chosen from disiloxanes and linear or cyclic polysiloxanes. The siloxanes contain the Si—O—Si bond and are substantially free of Si—OH bonds. The siloxanes can contain mixed hydrocarbyl groups. The polysiloxanes have a linear, or branched, or cyclic backbone of alternating silicon and oxygen atoms. If the polysiloxane is acyclic, it can be represented by the empirical formula, $Si_nO_{n-1}$, wherein n is at least 3 (or in the range of 3 to 8, or in the range of 3 to 4), and wherein the oxygen atoms are always individually disposed between and connected to two silicon atoms as a —Si—O—Si— moiety. The cyclic polysiloxanes can be represented by the empirical formula $Si_nO_n$ where n is as defined above, and wherein, as in the case of the acyclic polysiloxanes, the oxygen atoms are always individually disposed between and connected to two silicon atoms as a —Si—O—Si-moiety. Whether cyclic or acyclic, the backbone of a polysiloxane containing 4 or more silicon atoms can be branched on one or more of the silicon atoms of the backbone, in such case, the silicon atom that carries the branch is bonded to three or four separate oxygen atoms, and each such oxygen atom is in turn bonded to ah additional separate silicon atom.

Non-limiting examples of halosiloxanes include (trifluoromethyl)pentamethyldisiloxane, tris(fluoromethyl)trimethyldisiloxane, (2,2-difluoroethyl)pentaethyldisiloxane, bis(1,2-difluoroethyl)triethyldisiloxane, bis(trifluoromethyl)tetramethyldisiloxane, (trifluoromethyl)trimethyldicyclohexyldisiloxane, tetramethylbis(2,2-difluorocyclohexyl)disiloxane, tetramethylbutyl(4,4,4-trifluorobutyl)disiloxane, bis(p-trifluoromethylphenyl)tetraphenyldisiloxane, diphenyltrimethyl(difluoromethyl)disiloxane, tetraphenylbis(fluoromethyl)disiloxane, bis(difluoromethyl)tetramethylcyclotrisiloxane, tetra(fluoromethyl)tetramethyltrisiloxane, 3,3,3-trifluoropropylheptamethyltrisiloxane, bis(3,3,3-trifluoropropyl)hexamethyltrisiloxane, 3,3,3-trifluoropropylheptamethylcyclotrisiloxane, (trifluoromethyl)heptamethylcyclotetrasiloxane, bis(m-trifluoromethylphenyl)hexaphenylcyclotetrasiloxane, tri[methyl(3,3,3-trifluoropropyl)cyclopolysiloxane], tetra[methyl(3,3,3-trifluoropropyl)cyclopolysiloxane], poly[methyl(3,3,3-trifluoropropyl)siloxane], poly[dimethylsiloxane-co-methyl(3,3,3-trifluoropropyl)siloxane], (trichloromethyl)pentamethyldisiloxane, tris(chloromethyl)trimethyldisiloxane, 2,2-(dichloroethyl)pentaethyldisiloxane, bis(1,2-dichloroethyl)triethyldisiloxane, bis(trichloromethyl)tetramethyldisiloxane, (trichloromethyl)trimethyldicyclohexyldisiloxane, tetramethylbis(2,2-dichlorocyclohexyl)disiloxane, tetramethylbutyl(4,4,4-trichlorobutyl)disiloxane, bis(p-trichloromethylphenyl)tetraphenyldisiloxane, diphenyltrimethyl(dichloromethyl)disiloxane, tetraphenylbis(chloromethyl)disiloxane, bis(dichloromethyl)tetramethylcyclotrisiloxane, tetra(chloromethyl)tetramethyltrisiloxane, 3,3,3-trichloropropylheptamethyltrisiloxane, bis(3,3,3-trichloropropyl)hexamethyltrisiloxane, 3,3,3-trichloropropylheptamethylcyclotrisiloxane, (trichloromethyl)heptamethylcyclotetrasiloxane, bis(m-trichloromethylphenyl)hexaphenylcyclotetrasiloxane, tri[methyl (3,3,3-trichloropropyl)cyclopolysiloxane], tetra[methyl(3,3,3-trichloropropyl)cyclopolysiloxane], poly[methyl(3,3,3-trichloropropyl)siloxane], poly[dimethylsiloxane-co-methyl(3,3,3-trichloropropyl)siloxane], (tribromomethyl)pentamethyldisiloxane, (2,2-dibromoethyl)pentaethyldisiloxane, tetramethylbis(2,2-dibromocyclohexyl)disiloxane, bis(p-tribromomethylphenyl)tetraphenyldisiloxane, bis(dibromomethyl)tetramethylcyclotrisiloxane, bis(3,3,3-tribromopropyl)hexamethyltrisiloxane, 3,3,3-tribromopropylheptamethyltrisiloxane, 3,3,3-tribromopropylheptamethylcyclotrisiloxane, tri[methyl(3,3,3-tribromopropyl)cyclopolysiloxane], tetra[methyl(3,3,3-tribromopropyl)cyclopolysiloxane], poly[methyl(3,3,3-tribromopropyl)siloxane], and poly[dimethylsiloxane-co-methyl(3,3,3-tribromopropyl)siloxane], and the like. Mixtures of two or more of the foregoing siloxanes may also be used.

Suitable siloxanes having two or more different elements of halogen include, but are not limited to, (fluoromethyl)(chloromethyl)(bromomethyl)trimethyldisiloxane, (2,2-dichloroethyl)(2,2-difluoroethyl)tetraethyldisiloxane, (1,2-dichloroethyl)(1,2-difluoroethyl)triethyldisiloxane, (trichloromethyl)(tribromomethyl)tetramethyldisiloxane, tetramethyl(2,2-dichlorocyclohexyl)(fluoromethyl)disiloxane, tribromomethylphenyl)(p-trifluoromethylphenyl)(tetraphenyldisiloxane, tetraphenyl(chloromethyl)(fluoromethyl)disiloxane, (dichloromethyl)(difluoromethyl)tetramethylcyclotrisiloxane, bis(chloromethyl)bis(fluoromethyl)tetramethyltrisiloxane, (3,3,3-trichloropropyl)(3,3,3-trifluoropropyl)hexamethyltrisiloxane, (m-trichloromethylphenyl)(m-trifluoromethylphenyl)hexaphenylcyclotetrasiloxane, and the like. Mixtures of two or more of the foregoing siloxanes may also be used.

Suitable siloxanes are trisiloxanes and tricyclosiloxanes. Also suitable are siloxanes with at least one 3,3,3-trihalopropyl group. Additional suitable siloxanes include 3,3,3-trifluoropropylheptamethyltrisiloxane, 3,3,3-trifluoropropylheptamethylcyclotrisiloxane, tri[methyl(3,3,3-trifluoropropyl)cyclopolysiloxane], tetra[methyl(3,3,3-trifluoropropyl)cyclopolysiloxane], poly[methyl(3,3,3-trifluoropropyl)siloxane], poly[dimethylsiloxane-co-methyl(3,3,3-trifluoropropyl)siloxane]; 3,3,3-trichloropropylheptamethyltrisiloxane, 3,3,3-trichloropropylheptamethylcyclotrisiloxane, tri[methyl(3,3,3-trichloropropyl)cyclopolysiloxane], tetra[methyl(3,3,3-trichloropropyl)cyclopolysiloxane], poly[methyl(3,3,3-trichloropropyl)siloxane], poly[dimethylsiloxane-co-methyl(3,3,3-trichloropropyl)siloxane]; 3,3,3-tribromopropylheptamethyltrisiloxane, 3,3,3-tribromopropylheptamethylcyclotrisiloxane, tri[methyl(3,3,3-tribromopropyl)cyclopolysiloxane], tetra[methyl(3,3,3-tribromopropyl)cyclopolysiloxane], poly[methyl(3,3,3-tribromopropyl)siloxane], and poly[dimethylsiloxane-co-methyl(3,3,3-tribromopropyl)siloxane]. Also suitable are 3,3,3-trifluoropropylheptamethyltrisiloxane, 3,3,3-trifluoropropylheptamethylcyclotrisiloxane, poly[methyl(3,3,3-trifluoropropyl)siloxane], 3,3,3-trichloropropylheptamethyltrisiloxane, 3,3,3-trichloropropylheptamethylcyclotrisiloxane, poly[methyl(3,3,3-trichloropropyl)siloxane], 3,3,3-tribromopropylheptamethyltrisiloxane, 3,3,3-tribromopropylheptamethylcyolotrisiloxane, and poly[methyl(3,3,3-tribromopropyl)siloxane]. Additional suitable siloxanes are poly[methyl(3,3,3-trifluoropropyl)siloxane], poly[methyl(3,3,3-trichloropropyl)siloxane], and poly[methyl(3,3,3-tribromopropyl)siloxane].

Still another type of halogenation agent that may be used in forming aluminoxane composition of the invention is at least one silane of the formula $R'_nSiX_{4-n}$, where n=1-3, X is, independently, fluorine, chlorine or bromine, and where R' is, independently, a hydrocarbyl group having from one to about twenty carbon atoms. Each R' can be a straight chain, branched, cycloalkyl, aryl, or araalkyl group, R' can be an aryl group; when R' is an aryl group, it can have from six to about twenty carbon atoms; or it can be a phenyl group. R' can be a straight chain or branched hydrocarbyl group, and when R' is a straight chain or branched hydrocarbyl group, if can have from one to about twelve carbon atoms; or, R' can have from one to about six carbon atoms; the straight chain or branched hydrocarbyl group can be a methyl group.

Silanes that can be used as halogenation agents include, but are not limited to, trimethylfluorosilane, dimethyldifluorosilane, diethyldifluorosilane, diisopropyldifluorosilane, tert-butyltrifluorosilane, dicyclobutyldifluorosilane, tripentylfluorosilane, dicyclohexyldifluorosilane, triheptylfluorosilane, dicyclooctyldifluorosilane, triphenylfluorosilane, diphenyldifluorosilane, phenyltrifluorosilane, phenyldimethylfluorosilane, diphenylmethylfluorosilane, phenylmethyldifluorosilane, phenyldiisopropylfluorosilane, tritolylfluorosilane, ditolyldifluorosilane, trimethylchlorosilane, dimethyldichlorosilane, methyltrichlorosilane, triethylchlorosilane, diethyldichlorosilane, ethyltrichlorosilane, di-n-propyldichlorosilane, triisopropylchlorosilane, isobutyltrichlorosilane, dipentyldichlorosilane, cyclohexyltrichlorosilane, dicycloheptyldichlorosilane, dodecyltrichlorosilane, tert-butyldimethylchlorosilane, octylmethyldichlorosilane, dimethyloctadecylchlorosilane, chlorodimethyl-tert-hexylsilane, benzyltrichlorosilane, triphenylchlorosilane, diphenyldichlorosilane, phenyltrichlorosilane, phenyldimethylchlorosilane, diphenylmethylchlorosilane, phenylmethyldichlorosilane, phenyldiisopropylchlorosilane, tert-butyldiphenylchlorosilane, tritolylchlorosilane, ditolyldichlorosilane, trimethylbromosilane, dimethyldibromosilane, methyltribromosilane, triethylbromosilane, diisopropyldibromosilane, n-propyltribromosilane, tert-butyltribromosilane, dicyclopentyldibromosilane, trihexylbromosilane, cycloheptyltribromosilane, dioctyldibromosilane, triphenylbromosilane, diphenyldibromosilane, phenyltribromosilane, phenyldimethylbromosilane, tolyltribromosilane, phenylisopropyldibromosilane, naphthyltribromosilane, phenylchlorodifluorosilane, phenyldichlorofluorosilane, phenyldibromochlorosliane, diphenylbromofluorosilane, phenylmethylchlorofluorosilane, diphenylchlorofluorosilane, phenylisopropylchlorofluorosilane, ditolylchlorofluorosilane, tolylbromodichlorosilane, and ditolylbromofluorosilane. Suitable silanes are triphenylfluorosilane, triphenylchlorosilane, and triphenylbromosilane. Also suitable are silanes of the formula $(CH_3)_nSiX_{4-n}$, where n=1-3, and X is, independently, fluorine, chlorine or bromine; including, e.g., trimethylfluorosilane.

Yet another type of halogenation agent that can be used in forming aluminoxane composition of this Invention is a tin compound of the formula $R'_nSnX_{4-n}$, where n=1-3, X is, independently, fluorine, chlorine or bromine, and where R' is, independently, a hydrocarbyl group having from one to about twenty carbon atoms. R' can be a straight chain, branched, cycloalkyl, aryl, or araalkyl group. R' can be an aryl group, or, a straight chain or branched hydrocarbyl group. When R' is an aryl group, it can have from six to about twenty carbon atoms; the aryl group can be a phenyl group. When R' is a straight chain or branched hydrocarbyl group, it can have from one to about twelve carbon atoms; R' can have from one to about six carbon atoms; a suitable straight chain or branched hydrocarbyl group is a methyl group.

Tin compounds that can be used as halogenation agents include trimethylfluorostannane, diethylfluorostannane, di-n-propyldifluorostannane, tri-n-butylfluorostannane, dipentyldifluorostannane, cyclohexyltrifluorostannane, diheptyldifluorostannane, trioctylfluorostannane, didodecyldifluorostannane, dichlorodimethylstannane, trichloromethylstannane, triethylchlorostannane, diisopropyldichlorostannane, dicyclobutyldichlorostannane, cyclopentyltrichlorostannane, trihexylchlorostannane, dicycloheptyldichlorostannane, octyltrichlorostannane, dinonyldichlorostannane, decyltrichlorostannane, dimethyldibromostannane, bromotriethylstannane, tribromoethylstannane, cyclopropyltribromostannane, di-n-butyldibromodstannane, pentyltribromostannane, dihexyldibromostannane, trihepylbromostannane, dicyclooctlydibromostannane, dimethylchlorobromostannane, diethylfluorobromostannsne, isopropylfluorodichlorostannane, fluorotriphanylstannane, difluorodiphenylstannane, trifluorophenylstannane, fluorotritolylstannane, chlorotriphenylstannane, dichlorodiphenylstannane, trichlorophenylstannane, dichloroditolylstannane, bromotriphenylstannane, dibromodiphenylstannane, tribromophenylstannane, tolyltribromostannane, phenyldichlorobromostannane, diphenylfluorochlorostannane, diphenylfluorobromostannane, and the like. Suitable tin compounds are triphenylfluorostannane, triphenylchlorostannane, dichlorodimethylstannane, and triphenylbromostannane. Also suitable are tin compounds of the formula $(CH_3)_nSnX_{4-n}$, where n=1-3, and X is, independently, fluorine, chlorine or bromine.

Still another type of halogenation agent that can be used in forming aluminoxane composition of this invention include a hydrocarbyl aluminum halide of the formula $R''_mAlX_{3-m}$, where m=1 or 2, where X is, independently, fluorine, chlorine or bromine, and where R'' is, independently, a hydrocarbyl group having from one to about twenty carbon atoms. R'' can be a straight chain, branched, cycloalkyl, aryl, or araalkyl group. R" can be a straight chain; the straight chain can have from one to about fen carbon atoms.

Hydrocarbyl aluminum halides that can be used as halogenation agents include, but are not limited to, methylaluminum difluoride, dimethylaluminum fluoride, ethylaluminum difluoride, diethylaluminum fluoride, isopropylaluminum difluoride, diisopropylaluminum fluoride, n-butylaluminum difluoride, isobutylaluminum difluoride, diisobutylaluminum fluoride, dipentylaluminum fluoride, cyclohexylaluminum difluoride, diheptylaluminum fluoride, dicyclooctylaluminum fluoride, nonylaluminum difluoride, decylaluminum difluoride, diundecylaluminum fluoride, phenylaluminum difluoride, diphenylaluminum fluoride, tolylaluminum difluoride, ditolylaluminum fluoride, methylaluminum dichloride, dimethylaluminum chloride, ethylaluminum dichloride, diethylaluminum chloride, diisopropylaluminum chloride, di-n-butylaluminum chloride, isobutylaluminum dichloride, pentylaluminum dichloride, dicyclohexylaluminum chloride, heptylaluminum dichloride, cyclooctylaluminum chloride, dinonylaluminum chloride, didecylaluminum chloride, undecylaluminum chloride, phenylaluminum dichloride, diphenylaluminum chloride, tolylaluminum dichloride, ditolylaluminum chloride, methylaluminum dibromide, dimethylaluminum bromide, ethylaluminum dibromide, diethylaluminum bromide, isopropylaluminum dibromide, isobutylaluminum dibromide, diisobutylaluminum bromide, pentylaluminum bromide, cyclohexylaluminum bromide, heptylaluminum dibromide, cyclooctylaluminum bromide, dinonylaluminum bromide, decylaluminum dibromide, undecylaluminum bromide, phenylaluminum dibromide, diphenylaluminum bromide, tolylaluminum dibromide, and ditolylaluminum bromide.

Suitable hydrocarbyl aluminum halides are methylaluminum difluoride, dimethylaluminum fluoride, methylaluminum dichloride, dimethylaluminum chloride, methylaluminum dibromide, and dimethylaluminum bromide. Also suitable are methylaluminum difluoride and dimethylaluminum fluoride.

Finally, as alluded to above, mixtures of two or more halogenation agents may be used. This includes mixtures of different halogenation agents within the same type, mixtures of halogenation agents of different types, and mixtures of at least two different halogenation agents within the same type with at least one halogenation agent of a different type. Mixtures may be used in which the halogen elements in the halogenation agents are the same or different. It may be advantageous to use a mixture of halogenation agents, depending on the desired product aluminoxane source and the properties thereof (e.g., degree of halogenation, solubility, and stability).

(C) Lewis Base

Lewis base (C) can comprise mono-dentate donor such as $NR^2_3$, (wherein each $R^2$ is independently hydrogen or hydrocarbyl group having up to about 24 carbon atoms, or multidentate donor such as octamethyltrisiloxane (OMTS, $Me_3SiOSi(Me)_2OSiMe_3$). A wide range of Lewis bases can be used in this invention, including (i) those with O donor, such as mono-dentate ethers (e.g., $R^2_2O$, tetrahydrofuran (THF), $R^2_3SiOSiR^2_3$) and multi-dentate ethers (e.g., OMTS, $EtOCH_2CH_2OEt$), (II) those with N donor, such as mono-dentate amines (e.g., $NR^2_3$, $C_5H_5N$, $C_4H_4N$, $(R^2_3Si)_3M$) and multi-dentate amines (e.g., $Et_2NCH_2CH_2NEt_2$), and (iii) those with P or S mono-dentate and multi-dentate donors (e.g., $NR^2_3$, $PR^2_3$, and $SR^2_2$), and the like.

Lewis base (C) can comprise oxygen donors such as siloxanes, ethers or amine donors such as primary amine $NH_2R^2$, secondary amine $NHR^2_2$, or tertiary amine $NR^2_3$, or any mixture thereof, wherein $R^2$ in each occurrence is selected independently from hydrocarbyl group having up to about 20 carbon atoms, or hydrogen; and for amines having more than one $R^2$, each $R^2$ can be the same as or different from any other $R^2$. For example, Lewis base (C) can comprise a variety of amines, Including, but not limited to, $NMe_2Ph$, $NMe_2(CH_2Ph)$, $NEt_2Ph$, $NEt_2(CH_2Ph)$, or Lewis base (C) can comprise one or more long chain amines such as $NMe(C_nH_{2n+1})(C_mH_{2m+1})$, $NMe_2(C_nH_{2n+1})$, $NEt(C_nH_{2n+1})(C_mH_{2m+1})$, or $NEt_2(C_nH_{2n+1})$, wherein n and m are selected independently from an integer from about 3 to about 20. Examples of long chain amines of the formula $NMe(C_nH_{2n+1})(C_mH_{2m+1})$ include, but are not limited to, compounds such as $NMe(C_{16}H_{33})_2$, $NMe(C_{17}H_{35})_2$, $NMe(C_{18}H_{37})_2$, $NMe(C_{15}H_{33})(C_{17}H_{35})$, $NMe(C_{16}H_{33})(C_{18}H_{37})$, $NMe(C_{17}H_{35})(C_{18}H_{37})$, and the like. For example, $NMe(C_{18}H_{33})_2$ is typically the major species in a commercial long chain amine composition that usually comprises a mixture of several amines, Lewis base (C) can comprise $NMe_2Ph$, $NMe_2(CH_2Ph)$, $NEt_2Ph$, $NEt_2(CH_2Ph)$, $NMe(C_{16}H_{33})_2$. Lewis base (C) can also comprise phosphines.

Lewis base (C) can comprise at least one siloxane having at least one labile halogen atom, for example, poly[methyl(3,3,3-trifluoropropyl)siloxane].

Lewis base (C) can comprise monodentate Lewis base $R^5_nK$ (where $R^5$=hydrocarbyl group or silyl group; X=halogen, O, N, or P; and n= 1, 2, or 3). Non-limiting examples include: $C_6H_5F$ (fluorobenzene), $C_6H_5Cl$ (chlorobenzene), $Et_2O$ (diethylether), $^tBuOMe$ (t-butylmethylether), $^iPr_2O$ (diisopropylether), $(SiMe_3)_2O$ (hexamethyldisiloxane), $C_4H_8O$ (tetrahydrofuran), $PhNMe_2$ (dimethylaniline), $Et_3N$ (triethylamine), $PhCH_2NMe_2$ (dimethylbenzoamine), $C_5H_5N$ (pyridine), and $(CH_2)_5NMe$ (N-methylpiperidine).

Lewis base (C) can comprise bidentate Lewis base

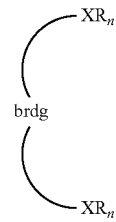

(where X=halogen, n=0; where X=O or S, n=1; where X=N or P, n= 2; and brdg=organic bridge biradical fragment, e.g., $—CH_2CH_2—$ or $—SiMe_2—$). Non-limiting examples include:

1,2-$F_2C_6H_4$ (1,2-difluorobenzene), 1,2-$Cl_2C_6H_4$ (1,2-dichlorobenzene), $EtOCH_2CH_2OEt$ (ethyleneglycoldiethylether), $(Me_3SiO)_2SiMe_2$ (OMTS, octamethyltrisiloxane), $Me_2N(CH_2CH_2)NMe_2$ (TMEDA, N,N',N'-tetramethylethylenediamine), and $Et_2N(CH_2CH_2)NEt_2$ (N,N,N',N'-tetramethylenediamine).

Lewis base (C) can comprise $NMeR^4_2$, where $R^4$ is C16-18 long chain alkyl).

(D) Transition Metal Component

Transition metal component (DJ can comprise any transition metal component having olefin polymerization potential. For example, without limitation, transition metal component (D) can comprise one or more metallocene transition metal components. For example, without limiting this invention, halogen, alkoxy, aryloxy, amide, or hydrocarbyl transition metal components are all suitable.

Transition metal component (D) can comprise catalyst precursor $ML_aX_{n-a}$;

M represents any transition metal catalyst compound in which the transition metal thereof is Group 3 to 10 of the Periodic Table including compounds of metal of lanthanide or actinide series. The Periodic Table referred to herein is that appearing on page 27 of the Feb. 4, 1985 issue of *Chemical & Engineering News*. Suitable catalyst compounds can also be described as d- and f-block metal compounds. See, for example, the Periodic Table appearing on page 225 of Moeller, et al., *Chemistry*, Second Edition, Academic Press, copyright 1984. Metal constituent of M may comprise Fe, Co, Ni, Pd, and V, and may comprise metals of Groups 4-6 (Ti, Zr, Hf, V, Nb, Ta, Cr, Mo, and W.

Thus transition metal catalyst compounds used in this Invention can be one or more of any Ziegler-Natta catalyst compound, any metallocene, any single-site non-metallocene, any compound of constrained geometry, any late transition metal complex, and any other transition metal compound or complex reported in the literature or otherwise generally known in the art to be an effective catalyst compound when suitably activated, including mixtures of at least two different types of such transition metal compounds or complexes, such as for example a mixture of a metallocene and a Ziegler-Natta olefin polymerization catalyst compound.

L represents group having ligand suitable for either Ziegler-Natta type catalyst precursor, or metallocene type catalyst precursor, or non-metallocene single-site catalyst precursor. At least one L may be group having cyclopentadienyl skeleton, or may be non-cyclopentdienyl; and a plurality of L may be the same or different and may be crosslinked to each other; X represents halogen, alkoxy, aryloxy, amide or hydrocarbyl group having 1 to about 20 carbon atoms; "a" represents a numeral satisfying the expression $0<a\leq n$; and n represents valence of transition metal atom M).

In L in transition metal component (D), group having cyclopentadienyl skeleton can comprise, for example, cyclopentadienyl group, substituted cyclopentadienyl group or polycyclic group having cyclopentadienyl skeleton. Example substituted cyclopentadienyl groups include hydrocarbon group having 1 to about 20 carbon atoms, halogenated hydrocarbon group having 1 to about 20 carbon atoms, silyl group having 1 to about 20 carbon atoms and the like, Silyl group according to this invention can include $SiMe_3$ and the like. Examples of polycyclic group having cyclopentadienyl skeleton include indenyl group, fluorenyl group and the like. Examples of hetero atom; of the group having at least one hetero atom include nitrogen atom, oxygen atom, phosphorous atom, sulfur atom and the like.

Example non-metallocene d-block or f-block metal compounds that can be used in this invention include, but are not limited to, transition metal compounds suitable for olefin polymerization such as Ziegler-Natta type catalysts. Typically, transition metal of Ziegler-Natta catalysts comprises at least two hydrocarbyl ligands. Examples of Ziegler-Natta catalyst systems are disclosed in U.S. Patent Application Number 2004/0102312, and are described herein as follows. Representative traditional Ziegler-Natta transition metal compounds include, but are not limited to, tetrabenzyl zirconium, tetrakis(trimethylsilylmethyl)zirconium, oxotris(trimethylsilylmethyl)vanadium, tetrabenzyl hafnium, tetrabenzyl titanium, bis(hexamethyl disilazido)dimethyl titanium, tris (trimethylsilylmethyl)niobium dichloride, tris(trimethylsilylmethyl)tantalum dichloride, and combinations thereof. Other Ziegler-Natta type systems that can be used in this invention include, but are not limited to, transition metal halides, oxyhalides or alkoxyhalides in the presence of an alkylating agent such as a dialkylaluminum alkoxide or trialkyl aluminum compound. Examples of this Ziegler-Natta type system include, but are not limited to, titanium and vanadium halides, oxyhalides or alkoxyhalides, such as titanium tetrachloride ($TiCl_4$), vanadium tetrachloride ($VCl_4$) and vanadium oxytrichloride ($VOCl_3$), and titanium and vanadium alkoxides, wherein the alkoxide moiety has a branched or unbranched alkyl group from 1 to 20 carbon atoms, or from 1 to 8 carbon atoms.

In still another aspect, useful d-block or f-block metal compounds that can be used in this invention include, but are not limited to, the Group 15-containing compounds, such as those disclosed in U.S. Patent Application Number 2004/0162312, and defined above, Examples of Group 15-containing compounds include, but are not limited to, Group 4 iminophenol complexes, Group 4 bis(amido) complexes, and Group 4 pyridyl-amide complexes that are active towards olefin polymerization to any extent. In one aspect, the Group 15-containing catalyst component can be described by the following formula:

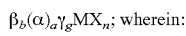

$\beta_b(\alpha)_a\gamma_gMX_n$; wherein:

β and γ are groups that each comprise at least one Group 14 to Group 16 atom; and β (when present) and γ are groups bonded to M through from 1 to 4 Group 14 to Group 16 atoms, wherein at least two atoms are Group 15-containing atoms; more particularly: β and γ are groups selected from Group 14 and Group 15-containing (and their non-valent equivalents when not linked by a group α): alkyls, aryls, alkylaryls, and heterocyclic hydrocarbons, and chemically bonded combinations thereof. In one aspect; and selected from Group 14 and Group 15-containing: $C_1$ to $C_{10}$ alkyls, $C_6$ to $C_{12}$aryls, $C_6$ to $C_{18}$ alkylaryls, and $C_4$ to $C_{12}$ heterocyclic hydrocarbons, and chemically bonded combinations thereof in a further aspect; and selected from $C_1$ to $C_{10}$ alkylamines, $C_1$ to $C_{10}$ alkoxys, $C_6$ to $C_{20}$ alkylarylamines, $C_6$ to $C_{18}$ alkylaryloxys, and $C_4$ to $C_{12}$ nitrogen containing heterocyclic hydrocarbons, and $C_4$ to $C_{12}$ alkyl substituted nitrogen containing heterocyclic hydrocarbons and chemically bonded combinations thereof in still another aspect; and selected from anilinyls, pyridyls, quinolyls, pyrrolyls, pyrimidyls, purinyls, imidazyls, indolyls, $C_1$ to $C_6$ alkyl substituted groups selected from anilinyls, pyridyls, quinolyls, pyrrolyls, pyrimidyls, purinyls, imidazyls, indolyls; $C_1$ to $C_6$ alkylamine substituted groups selected from anilinyls, pyridyls, quinolyls, pyrrolyls, pyrimidyls, purinyls, imidazyls, indolyls, amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, and chemically bonded combinations thereof in yet a further aspect:

α can be a linking (or "bridging") moiety that, when present, forms a chemical bond to each of β and γ, or to two γ moieties, thus forming a "γαγ" "γαβ" ligand bound to M; α can also include a Group 14 to Group 16 atom which can be bonded to M through the Group 14 to Group 18 atom in one aspect; and more particularly, α can be a divalent bridging group selected from alkylenes, arylenes, alkenylenes, heterocyclic arylenes, alkylarylenes, heteroatom containing alkylenes, heteroatom containing alkenylenes and heterocyclic hydrocarbonylenes in another aspect; and selected from $C_1$ to $C_{10}$ alkylenes, $C_2$ to $C_{10}$ alkenylenes, $C_6$ to $C_{12}$ arylenes, $C_1$ to $C_{10}$ divalent ethers, $C_6$ to $C_{12}$ O- or N-containing arylenes, $C_2$ to $C_{10}$ alkyleneamines, $C_6$ to $C_{12}$ aryleneamines, and substituted derivatives thereof in yet a further aspect;

a is typically 0 or 1;
b is typically an integer from 0 to 2;
g is an integer from 1 to 2; wherein in one aspect, a is 1, b is 0, and g is 2;
M is selected from Group 3 to Group 12 atoms in one aspect; and selected from Group 3 to Group 10 atoms in a further aspect; and selected from Group 3 to Group 6 atoms in yet another aspect; and selected from Ni, Cr, Ti, Zr and Hf in still a further aspect; and selected from Zr and Hf in yet one other aspect;
each X is as defined above for A and B in structure (V); and
n is an integer from 0 to 4 in one aspect; and an integer from 1 to 3 in another aspect; and an integer from 2 to 3 in still another aspect.

As used in this description, "chemically bonded combinations thereof" means that adjacent groups, (β and γ groups) can form a chemical bond between them; in one aspect, the β and γ groups are chemically bonded through one or more a groups there between.

As used herein, the terms "alkyleneamines", "aryleneamines", describe alkylamines and arylamines (respectively) that are deficient by two hydrogens, thus capable of forming chemical bonds with two adjacent γ groups, or adjacent β and γ groups. Thus, examples of an alkyleneamine include, but are not limited to, —CH$_2$CH$_2$N(CH$_3$)CH$_2$CH$_2$— and —CH$_2$CH$_2$N(H)CH$_2$CH$_2$—. Examples of a heterocyclic hydrocarbylene or aryleneamine include, but are not limited to, —C$_5$H$_3$N— (divalent pyridine). An "alkylene-arylamine" includes a group such as, for example, —CH$_2$CH$_2$(C$_5$H$_3$N)CH$_2$CH$_2$—.

Examples of compounds having the general formula $\beta_b(\alpha)_a\gamma_g MX_n$ include, but are not limited to, the following compounds:

1.

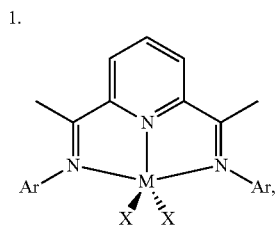

including compounds such as those disclosed in WO 99/02472, wherein examples of Ar include 2-MeC$_6$H$_4$, 2,4,6-Me$_3$C$_6$H$_2$, 2-i-PrC$_6$H$_4$, and the like; and examples of M include Fe or Ni; and examples of X include Cl, Br, or a C$_1$ to C$_{12}$ hydrocarbyl;

2.

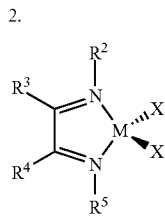

including compounds such as those disclosed in U.S. Pat. No. 5,880,241, wherein examples of $R^2$ and $R^5$ (as used therein) include 2,6-i-Pr$_2$C$_6$H$_3$, 2,6-Me$_2$C$_6$H$_3$, and 2,4,6-Me$_3$C$_6$H$_2$; examples of $R^3$ and $R^4$ (as used therein) include methyl, ethyl, propyl, butyl, and benzyl; examples of M include Pd and Ni; and examples of X include Cl, Br, and a C$_1$ to C$_{12}$ hydrocarbyl such as Me;

3.

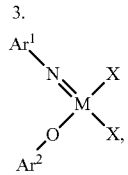

including compounds such as those disclosed in Nomura et al., *Macromolecules*, 2005, in press (Abstract published by the American Chemical Society, *Macromolecules*, ASAP Article 10.1021/ma059629s; 80024-9297(05)00829-7; Web Release Date Jun. 15, 2005), wherein examples of Ar$_1$ include 2,6-Me$_2$C$_6$H$_3$, and 2,6i-Pr$_2$C$_6$H$_3$; examples of Ar$_2$ include 2,6-Me$_2$C$_6$H$_3$, 2,4,6-Me$_3$C$_6$H$_2$, 2,6-i-Pr$_2$C$_6$H$_3$, and 2,8-Pr$_2$C$_6$H$_3$; examples of M include V; and examples of X include Cl, Br, and a C$_1$ to Cl$_{12}$ hydrocarbyl;

4.

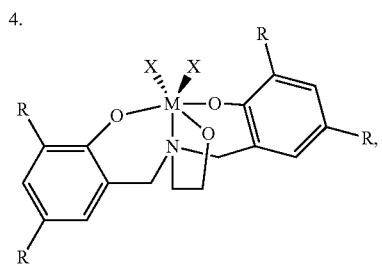

including compounds such as those disclosed in Weymouth et al., *Macromolecules*, 2005, 38, 2552-2558, wherein examples of M include Zr or Hf; examples of X include a C$_1$ to C$_{12}$ hydrocarbyl such as CH$_2$C$_6$H$_5$; examples of R (as used therein) include Me, Ph, or t-Bu; and examples of 0 include NMe$_2$, OMe, and the like; and 5. Any Combination of the Above Compounds.

In each of these compounds. If X is a halide or alkoxide, these metal compounds typically are used in conjunction with an alkylating agent such as a trialkyl aluminum or alkoxyaluminum dialkyl reagent to convert these compounds to the corresponding dialkyl species.

Example substituted cyclopentadienyl groups include methylcyclopentadienyl group, ethylcyclopentadienyl group, n-propylcyclopentadienyl group, n-butylcyclopentadienyl group, isopropylcyclopentadienyl group, isobutylcyclopentadienyl group, sec-butylcyclopentadienyl group, tertbutylcyclopentadienyl group, 1,2-dimethylcyclopentadienyl group, 1,3-dimethylcyclopentadienyl group, 1,2,3-trimethylcyclopentadienyl group, 1,2,4-trimethylcyclopentadienyl group, tetramethylcyclopentadienyl group, pentamethylcyclopentadienyl group and the like.

Example polycyclic groups having cyclopentadienyl group include indenyl group, 4,5,6,7-tetrahydroindenyl group, fluorenyl group and the like.

Example groups having at least one hetero atom include methylamino group, tert-butylamino group, benzylamino group, methoxy group, tert-butoxy group, phenoxy group, pyrrolyl group, thiomethoxy group and the like.

One or more groups having cyclopentadienyl skeleton, or one or more group having cyclopentadienyl skeleton and one or more group having at least one hetero atom, may be crosslinked with (i) alkylene group such as ethylene, propylene and the like; (ii) substituted alkylene group such as isopropylidene, diphenylmethylene and the like; or (iii) silylene group or substituted silylene group such as dimethylsilylene group, diphenylsilylene group, methylsilylsilylene group and the like.

Examples of transition metal component (D) $ML_aX_{n-a}$, wherein M comprises zirconium, include bis(cyclopentadienyl)zirconiumdichloride, bis(methylcyclopentadienyl)zirconiumdichloride, bis(pentamethylcyclopentadienyl)zirconiumdichloride, bis(indenyl)zirconiumdichloride, bis(4,5,6,7-tetrahydroindenyl) zirconiumdichloride, bis(fluorenyl)zirconiumdichloride, ethylenebis(indenyl)zirconiumdichloride, dimethylsilylene(cyclopentadienylfluorenyl)zirconiumdichloride, diphenylsilylenebis(indenyl) zirconiumdichloride, cyclopentadienyldlmethylaminozirconiumdichloride, cyclopentadienylphenoxyzirconium dichloride, dimethyl(tert-butylamino)(tetramethylcyclopentadienyl) silanezirconiumdichloride, isopropylidene(cyclopentadienyl)(3-tert-butyl-5-methyl-2-phenoxy)zircon, dimethylsilylene(tetramethyl 5-methyl-2-phenoxy) zirconiumdichloride and the like.

Additional exemplary transition metal component (D) $ML_aX_{n-a}$ include components wherein zirconium is replaced with titanium or hafnium in the above zirconium components.

Alkylated catalyst precursors useful in this invention are; rac-dimethylsilylbis(2-methyl-4-phenyl-indenyl)zirconium dimethyl; rac-dimethylsilylbis(2-methyl-1-indenyl) zirconium dimethyl; rac-dimethylsilylbis(2-methyl-4,5-benzoindenyl) zirconium dimethyl; ethylenebis(tetrahydroindenyl) zirconium dimethyl, and ethylenebis(indenyl)zirconium dimethyl. Alkylated catalyst precursor can be generated in-situ through reaction of alkylation agent with the halogenated version of the catalyst precursor. For example, bis(cyclopentadienyl)zirconium dimethyl can be treated with triisobutylaluminum (TIBA) and then combined with activator composition (E).

Additional non-limiting and representative metallocene compounds that can be used in the present invention include mono-cyclopentadienyl compounds such as pentamethylcyclopentadienyl titanium trimethyl, pentamethylcyclopentadienyl titanium tribenzyl, dimethylsilyltetramethyl-cyclopentadienyl-tert-butylamido titanium dimethyl, dimethylsilyltetramethylcyclopentadienyl-tert-butylamido zirconium dimethyl, dimethylsilyltetramethylcyclopentadienyl-dodecylamido hafnium dihydride, dimethylsliyitetramethylcyclopentadienyl-dodecylamido hafnium dimethyl, unbridged biscyclopentadienyl compounds such as bis(1,3-butylmethylcyclopentadienyl)zirconium dimethyl, bis(1,3-butylmethylcyclopentadienyl)zirconium dibenzyl, pentamethylcyclopentadienyl-cyclopentadienyl zirconium dimethyl, (tetramethylcyclopentadienyl)(n-propylcyclopetadienyl)zirconium dimethyl; bridged bis-cyclopentadienyl compounds such as dimethylsilylbis(tetrahydroindenyl)zirconium dimethyl and silacyclobutyl(tetramethylcyclopentadienyl)(n-propyl-cyclopentadienyl)zirconium dimethyl; bridged bisindenyl compounds such as dimethylsilylbis(indenyl) zirconium dimethyl, dimethylsilylbis(indenyl)zirconium dibenzyl, dimethylsilylbis(indenyl) hafnium dimethyl, dimethylsilylbis(2-methylbenzindenyl) zirconium dimethyl, dimethylsilylbis(2-methyl-benzindenyl)zirconium dibenzyl; and fluorenyl ligand-containing compounds, for example, diphenylmethyl(fluorenyl)(cyclopentadienyl)zirconium dimethyl; and the additional mono- and bis-cyclopentadienyl compounds such as those listed and described in U.S. Pat. Nos. 5,017,714 and 5,324,800, and in EP-A-0 591 758, (E) Activator Composition Activator composition (E) comprises aluminoxane source (A), halogen source (B), and Lewis base (C). Activator composition (E) can be derived from aluminoxane source (A), halogen source (B), and Lewis base (C) combined in any order. Activator composition (E) can be obtained by combining aluminoxane source (A) with Lewis base (C), followed by combining with halogen source (B). In this application, unless an order of combination is stated, no specific order of combination is intended or implied.

Activator composition (E) can be derived from a method whereby aluminoxane source (A) is combined with Lewis base (C) comprising $NR^2_3$, wherein each $R^2$ is independently hydrogen atom or hydrocarbyl group having up to about 24 carbon atoms to form first product and at least a portion of the first product is combined with halogen source (B) comprising alpha, alpha, alpha-trifluorotoluene.

(F) Catalyst for Olefin Polymerization

Activator composition (E) and transition metal component (D) can be each added independently, yet substantially simultaneously, to monomer to catalyze polymerization. Activator composition (E) and transition metal component (D) can be combined to form product and at least a portion of product can be added to monomer to catalyze polymerization. The ratio of activator composition (E) to transition metal atom (M) of transition metal component (D) based on M to Al atom can be 1 to 10,000, or 10 to 1000, or 30 to 500.

(G) Polymerization

In the present invention, any olefin or dioelfin having 2 to 20 carbon atoms can be used as a monomer for polymerization. Specific examples thereof include ethylene, propylene, butene-1, pentene-1, hexene-1, heptene-1, octene-1, nonene-1, decene-1, hexadecane-1, eicocene-1,4-methylpentene-1,5-methyl-2-pentene-1, vinylcyclohexane, styrene, dicyclopentadiene, norbornene, 5-ethylidene-2-norbornene and the like, but are not limited thereto. In the present invention, copolymerization can be conducted using two or more monomers, simultaneously. Specific examples of the monomers constituting the copolymer include ethylene/an α olefin such as ethylene/propylene, ethylene/butene-1, ethylene/hexene-1, ethylene/propylene/butene-1, ethylene/propylene/5-ethylidene-2-norbornene and the like, propylene/butene-1, and the like, but are not limited thereto.

The polymerization method is not limited, and both liquid phase polymerization method and gas phase polymerization method can be used. Examples of solvent used for liquid phase polymerization include aliphatic hydrocarbons such as butane, pentane, heptane, octane and the like; aromatic hydrocarbons such as benzene, toluene and the like; and hydrocarbon halides such as methylene chloride and the like. It is also possible to use at least a portion of the olefin to be polymerized as a solvent. The polymerization can be conducted in a batch-wise, semibatch-wise or continuous manner, and polymerization may be conducted in two or more stages which differ in reaction conditions. The polymerization temperature can be from about −50° C. to about 200° C., or from 0° C. to about 100° C. The polymerization pressure can be from atmospheric pressure to about 100 kg/cm$^2$, or from atmospheric pressure to about 50 kg/cm$^2$. Appropriate polymerization time can be determined by means known to those skilled in the art according to the desired olefin polymer and reaction apparatus, and is typically within the range from about 1 minute to about 20 hours. In the present invention, a chain transfer agent such as hydrogen may be added to adjust the molecular weight of olefin polymer to be obtained in polymerization.

Organoaluminum compound can be added during polymerization to remove Impurities, such as water. Organoaluminum compound useful herein can comprise a variety of organoaluminum compounds, including at least one currently known organoaluminum compound, for example, organoaluminum compound $R^3{}_cAlY_{3-c}$ (wherein $R^3$ represents hydrocarbon group having 1 to about 20 carbon atoms; Y represents hydrogen atom and/or halogen atoms; and "c" represents an integer of 0 to 3). Specific examples of $R^3$ include methyl group, ethyl group, n-propyl group, n-butyl group, isobutyl group, n-hexyl group and the like. Specific examples of the halogen atom for Y include fluorine atom, chlorine atom, bromine atom and iodine atom. Specific examples of the organoaluminum compound $R^3{}_cAlY_{3-c}$ include trialkylaluminums such as trimethylaluminum, triethylaluminum, tri-n-propylaluminum, trisobutylaluminum, tri-n-hexylaluminum and the like; dialkylaluminum chloride such as dimethylaluminum chloride, diethylaluminum chloride, di-n-propylaluminum chloride, diisobutylaluminum chloride, di-n-hexylaluminum chloride and the like; alkylaluminum dichlorides such as methylaluminumdichloride, ethylaluminum dichloride, n-propylaluminum dichloride, isobutylaluminum dichloride, n-hexylaluminum dichloride and the like; and dialkylaluminum hydrides such as dimethylaluminum hydride, diethylaluminum hydride, di-n-propylaluminum hydride, diisobutylaluminum hydride, di-n-hexylaluminum hydride and the like.

EXAMPLES

Table 1 is referenced in the following examples.

TABLE 1

Gel Data for Lewis Base Modified, Partially Halogenated Aluminoxane Compositions of This Invention

| col. 1 | MAO col. 2 | F-MAO[4] col. 3 | OMTS treated F-MAO EX. 2 col. 4 | OMTS treated F-MAO EX. 1 col. 5 | OMTS treated F-MAO EX. 3 col. 6 | Amine treated F-MAO EX. 4 col. 7 | Amine and TFT-treated MAO EX. 5 col. 8 |
|---|---|---|---|---|---|---|---|
| OMTS (mol % relative to Al atoms) | 0 | 0 | 0.9 | 2.0 | 8 | 0 | 0 |
| $NR_3$[1] (mol % relative to Al atoms) | 0 | 0 | 0 | 0 | 0 | 6 | 10 |
| F (mol % relative to Al atoms) | 0 | 4.3 | 3.6 | 4.3 | 4.3 | 4.5 | 5.0 |
| Gel (%) after 6 months | Solidified | 6 | 0 | 0 | 0 | 0[3] | 0 |
| Gel (%) after 18 months | — | — | 0 (16.2)[2] | 0 | 0 (32.0)[2] | — | 0 |

[1]$NR_3$ is a long chain amine $NMeR_2$ with R = alkyl containing 16 to 18 carbons.
[2]No solid MAO gel formed. However, a sticky liquid phase under the bottom of the container formed. The number in the bracket indicates the amount of the second layer liquid in wt %.
[3]Heated at 45° C. for 2 months.
[4]Partially flourinated MAO.

Table 2 is referenced in the following examples.

TABLE 2

Polyethylene (PE) Productivity for Ethylenebis(indenyl) Zirconium Dimethyl Activated with Methylaluminoxane, with Partially Halogenated Methylaluminoxane, and with Compositions of This Invention

| col. 1 | MAO col. 2 | F-MAO[3] col. 3 | OMTS treated F-MAO EX. 2 Col. 4 | OMTS treated F-MAO EX. 1 col. 5 | OMTS treated F-MAO EX. 3 col. 6 | Amine treated F-MAO EX. 4 col. 7 | Amine and TFT treated MAO EX. 5 col. 8 |
|---|---|---|---|---|---|---|---|
| OMTS (mol % relative to Al atoms) | 0 | 0 | 1 | 2 | 8 | 0 | 0 |
| $NR_3$ (mol % relative to Al atoms) | 0 | 0 | 0 | 0 | 0 | 6 | 10 |
| F (mol % relative to Al atoms) | 0 | 4.3 | 3.6 | 4.3 | 4.3 | 4.5 | 5.0 |
| Activity (kg/mmol Zr/hr) for Al:Zr = 50:1 (fresh) | 28/41 | 60/86 | — | 272/293 | — | 130 | 44 |

TABLE 2-continued

Polyethylene (PE) Productivity for Ethylenebis(indenyl) Zirconium
Dimethyl Activated with Methylaluminoxane, with Partially Halo-
genated Methylaluminoxane, and with Compositions of This Invention

| col. 1 | MAO col. 2 | F-MAO[3] col. 3 | OMTS treated F-MAO EX. 2 Col. 4 | OMTS treated F-MAO EX. 1 col. 5 | OMTS treated F-MAO EX. 3 col. 6 | Amine treated F-MAO EX. 4 col. 7 | Amine and TFT treated MAO EX. 5 col. 8 |
|---|---|---|---|---|---|---|---|
| Activity (kg/mmol Zr/hr) for Al:Zr = 400:1 (fresh) | 112/130 | 145/182 | — | too hot[1] | — | 134 | 59 |
| Activity (kg/mmol Zr/hr) for Al:Zr = 50:1 (18 months)[2] | — | — | 274 | 246/268 | 354 too hot[1] | — | 38 |

(2 L autoclave, 70° C., 50 PSI, 2.15 μmol ethylenebis(indenyl)zirconium dimethyl (1.08 μmol for composition of this invention), 1 ml of 10% TIBA in hexane, 15 min)
[1]Reaction temperature not controllable with cooling system, due to speed of polymerization being too fast for obtaining an accurate activity result.
[2]Aged at room temperature for 18 months.
[3]Partially fluorinated MAO.

Table 2 shows that the OMTS treated F-MAO (see columns 5 and 6) has the highest activity; in a 2 L reactor, if a 2.15 μmol standard loading of Zr was charged even with as low as 50 equivalents OMTS treated F-MAO in columns 5 and 6, the reaction temperature was still found to be difficult to controlled with the cooling system to obtain an accurate activity result. The Zr loading had to be cut from 2.15 to 1.08 μmol to obtain a relatively good result (columns 4 and 5). Even so, the OMTS treated F-MAO with a higher OMTS content (column 6) was still out of control. Table 2 also shows that the amine treated F-MAO (see column 7) could be much more active than MAO at Al:Zr=50:1, but was comparable to (or slightly more active than) MAO at Al:Zr 400:10.

However, the modified MAO after the treatment with 10 mol % amine first then with TFT based on 5 mol % F (column 8) displayed significantly lower activity at Al:Zr=400, although was still comparable to MAO at Al:Zr 50.

MAO and F-MAO (partially fluorinated MAO, or F-MAO derived from the treatment of MAO with TFT (alpha,alpha,alpha-trifluorotoluene)) toluene solutions used in the following examples were all Albemarle Corporation commercial products, 30% MAO (Al=13 wt % by ICR) and 30% F-MAO (Al=12 wt % by ICP and F=4 mol % relative to Al atoms by NMR) were used.

Example 1

Preparation-1 of OMTS Modified F-MAO
Containing 4 mol % F and 2 mol % OMTS Relative
to Al Atoms In the drybox under purified $N_2$ atmosphere, 14.1 g F-MAO (85.8 mmol Al and 2.83 mmol F) was placed in a 20 ml vial with a magnetic stirbar. OMTS 0.31 g (1.3 mmol) was then slowly added to the F-MAO solution under stirring. A two-phase liquid formed. The sample was then heated at 78° C. for a total 3.5 hrs. The two-phase liquid became homogeneous. The sample was tested for polymerization of ethylene using standard procedures (described in Example 6), as it was fresh. Then it was aged for 8 months at ambient Indoor (about 20-25° C. range) and analyzed for gel content. After 18 months of aging at ambient, the sample was tested again for ethylene polymerization and re-analyzed for gel content The gel data and polymerization test results are listed in Table 1 column 5 and Table 2 column 5, respectively.

Example 2

Preparation-2 of OMTS-Modified F-MAO
Containing 4 mol % F and 1 mol % OMTS Relative
to Al Atoms In the drybox under purified $N_2$ atmosphere, about 180 g F-MAO in an 8 ounce bottle (Al=11.0%, F=3.55 mol. % relative to Al atoms) with a magnetic stirbar was placed on a magnetic stirring plate. OMTS 1.0 g (4.2 mmol) was then slowly added to the F-MAO solution under stirring for overnight. No two-phase liquid formed. The sample was analyzed with NMR that estimates an OMTS content of 0.9 mol % relative to Al atoms. The sample was then aged for 6 months at ambient indoor (~20-25° C. range) and analyzed for gel content. After 18 months of aging at ambient, the sample was tested for ethylene polymerization using standard polymerization procedures (described, in Example 6) and re-analyzed for gel content. The gel formation data and polymerization test results are listed in Table 1 Column 4 and Table 2 Column 4, respectively.

Example 3

Preparations of OMTS Modified F-MAO Containing
4 mol % F and 8 mol % OPTS Relative to Al Atoms In the drybox under purified $N_2$ atmosphere, 28.1 g F-MAO (131 mmol Al and 5.8 mmol F) was placed in a 4 oz reaction bottle with a magnetic stirbar. 2.44 g OMTS (10.3 mmol) was then slowly added to the F-MAO solution under stirring. A two-phase liquid formed. The sample was then aged for 8 months at ambient indoor (about 20-25° C. range) and analyzed for gel content. After 18 months of aging at ambient, the sample was tested for ethylene polymerization using standard polymerization procedures (described in Example 6) and re-analyzed for gel content. The gel formation data and polymerization test results are listed in Table 1 column 8 and Table 2 column 8, respectively.

Example 4

Preparation-1 of Amine Modified F-MAO Containing 5 mol % F and 6 mol % Amine relative to Al Atoms In the drybox under purified $N_2$ atmosphere, 2.5 g slightly gelled F-MAO (Al=10.7%, F=4.5 mol % relative to Al atoms) was placed in a 20 ml vial with a magnetic stirbar. A long-chain amine (Armeen M2HT, a mixture of amines with a major structure $NMeR^4_2$, where $R^4$ is a long-chain alkyl containing 16 to 18 carbons, from Akzo Nobel commercial product, used as it is without further purification, N=1.88 mmol/g by quantitative NMR analysis) 0.3 g (0.58 mmol) was then slowly added to the F-MAO solution under stirring. The hazy solution became clear. The sample was tested for ethylene polymerization using standard procedures (described In Example 6). Then the sample was sealed with electrical tapes, taken out of the drybox, and placed in a 45° C. oil-bath for 2 months. The sample was still clear, no indication of typical MAO gel formation. The sample was then discarded after heating. The gel formation data and polymerization test results are listed in Table 1 column and Table 2 column 7, respectively.

Example 5

Preparation-2 of Amine and TFT Modified MAO Containing 5 mol % F and 10 mol % Amine Relative to Al Atoms This experiment is different from Example 4. MAO was first treated with amine, and then with TFT In the drybox under purified Na atmosphere, 31 g MAO (Al=13.5%, 0.155 mol Al) was placed in a 4 oz reaction bottle with a magnetic stirbar. Long-chain amine (Armeen M2HT) 8.3 g (15.4 mmol) was then slowly added to the MAO solution under stirring. The solution was allowed to stir for 30 min, resulting a light yellow solution. Next, a 10% TFT toluene solution 3.8 g (containing 7.76 mmol F) was added slowly to the amine treated MAO solution. Deep blue color material formed. The deep blue solution was then heated at 75° C. for 15 min. The blue color disappeared, resulting in a light yellow solution. The sample was tested for ethylene polymerization using standard polymerization procedures (described in Example 6). Then the sample was aged for 6 months at ambient indoor (about 20-25° C. range) and analyzed for gel content. After 18 months of aging at ambient, the sample was tested for ethylene polymerization again and re-analyzed for gel content. The gel formation data and polymerization test results are listed in Table 1 Column 8 and Table 2 Column 8, respectively.

Example 6

Ethylene Polymerization—Standard Polymerization Procedures

Preparation of ethylenebis(indenyl) zirconium dimethyl solution in drybox; Ethylenebis(indenyl)zirconium dimethyl solution was prepared in a drybox by weighing 7.0-13.0 mg of zirconocene compound into a 20 mL vial. Dry toluene was added to make a solution with a concentration of 2.15 micromol/g. The vial was capped and shaken to form a solution.

Reactor Pre-Set: The reactor temperature was set to desired temperature. $N_2$ was flushed from the reactor three times with ethylene, each time pressuring to 50 psi, then venting to 0 psi. Added to the reactor was: total 1200 mL isohexane with 1 ml 10% TIBA solution through the 600 ml solvent bomb. The reactor temperature was equilibrated with the agitator at a low speed.

Preparation of Active Catalyst Solution: A 5 mL dried syringe was tared without the needle on the balance in the dry box. A desired amount of activator solution was weighed into the syringe based on Al:Zr 400:1 or 50:1 3, Add 1.00 g (0.5 g for OMTS modified F-MAO activators) zirconocene solution into the syringe with the activator sample. Attach a 12 inch 18 gauge needle to the syringe, cap the needle with a crimp-top vial, and note the time that the pre-contact solution was completed.

Addition of Active Catalyst Solution to Reactor: Active catalyst solution was removed from the drybox. The agitator was stopped; the pressure was vented down and the temperature of the solvent was noted. The injector port valve was opened, the crimp-top vial was removed from the needle tip and the entire needle shaft was inserted into the injector port. The active catalyst solution was injected into the reactor, the needle was removed, the injector port was closed, the agitator was started to about 850 rpm, and then the ethylene valve was quickly opened to begin pressuring the reactor with ethylene.

Reaction Conditions; Run time was 15 or 30 minutes; temperature, pressure, and agitator speed were controlled at 70° C., 50 psi, and 800-825 rpm, respectively.

Reaction Quenching: Polymerization reactions were ended by closing the ethylene valve and stopping the agitator.

Polymer Treatment: Polymer was dried to constant weight by filtering the slurry in methanol through a vacuum flask with a filter funnel and drying in vacuum oven.

This Invention is advantageous as compared to MAO in that it exhibits much higher activities, e.g., some examples have 8 times more activity than MAO. The MAO cost in a catalytic system is high because excess MAO, e.g., 400-1000:1 Al:Zr ratio, is required to obtain a fully active system.

While the present invention has been described in terms of one or more preferred embodiments, it is to be understood that other modifications may be made without departing from the scope of the invention, which is set forth in the claims below.

What is claimed is:

1. A composition comprising individual components of:
    a) aluminoxane source;
    b) halogen source; and
    c) Lewis base,
    wherein said aluminoxane source is combined with said Lewis base before combining with said halogen source; and wherein said halogen source is:
    (i) a halohydrocarbon of the formula $R_nCX_{4-n}$, where n=1-3, X is fluorine, and wherein R is, independently, a hydrogen atom or a hydrocarbyl group having from one to about twenty carbon atoms;
    (ii) a halohydrocarbon of the formula: $ArG_n$, wherein Ar is an aromatic hydrocarbon ring system containing up to about 25 carbon atoms, G is $-CX_3$, $-CX_2R^1$, or $-CX(R^1)_2$, X is, fluorine, $R^1$ is, independently, a hydrogen atom or $C_{1-4}$ alkyl group; and n is 1 to 5;
    (iii) a siloxane having at least one hydrocarbyl group containing from about 1 to 30 carbon atoms, wherein at least one of the hydrocarbyl groups contains at least one labile fluorine atom;
    (iv) a silane of the formula $R'_nSiX_{4-n}$, wherein n=1-3, X is fluorine, and wherein R' is, independently, a hydrocarbyl group having from one to about twenty carbon atoms;

(v) a tin compound of the formula $R'_n SnX_{4-n}$, wherein n=1-3, X is fluorine, and wherein R' is, independently, a hydrocarbyl group having from one to about twenty carbon atoms; or (vi) a hydrocarbyl aluminum halide of the formula $R''_m AlX_{3-m}$, wherein m=1 or 2, where X is fluorine, and wherein R" is, independently, a hydrocarbyl group having from one to about twenty carbon atoms.

2. The composition of claim 1 wherein the aluminoxane source comprises one or more of methylaluminoxane, ethylaluminoxane, and isobutylaluminoxane.

3. The composition of claim 1, wherein the Lewis base comprises one or more of mono-dentate donor and multi-dentate donor.

4. The composition of claim 1, wherein the Lewis base comprises octamethyltrisiloxane.

5. The composition of claim 1, wherein the Lewis base comprises $NMeR^2_2$, and each $R^2$ is independently hydrogen atom or hydrocarbyl group having up to about 24 carbon atoms.

6. A composition derived from at least:
a) aluminoxane source comprising up to about 30 mol % fluorine atoms relative to Al atoms; and
h) Lewis base,
wherein said halogen atoms in said aluminoxane source is provided by a halogen source, wherein said halogen source is:
(i) a halohydrocarbon of the formula $R_n CX_{4-n}$, wherein n=1-3, X is fluorine, and wherein R is, independently, a hydrogen atom or a hydrocarbyl group having from one to about twenty carbon atoms;
(ii) a halohydrocarbon of the formula: $ArG_n$, wherein Ar is an aromatic hydrocarbon ring system containing up to about 25 carbon atoms, G is $-CX_3$, $-CX_2R^1$, or $-CX(R^1)_2$, X is fluorine, $R^1$ is, independently, a hydrogen atom or $C_{1-4}$ alkyl group; and n is 1 to 5;
(iii) a siloxane having at least one hydrocarbyl group containing from about 1 to 30 carbon atoms, wherein at least one of the hydrocarbyl groups contains at least one labile fluorine atom;
(iv) a silane of the formula $R'_n SiX_{4-n}$, wherein n=1-3, X is fluorine, and wherein R' is, independently, a hydrocarbyl group having from one to about twenty carbon atoms;
(v) a tin compound of the formula $R'_n SnX_{4-n}$, wherein n=1-3, X is fluorine, and wherein R' is, independently, a hydrocarbyl group having from one to about twenty carbon atoms; or
(vi) a hydrocarbyl aluminum halide of the formula $R''_m AlX_{3-m}$, wherein m =1 or 2, where X is fluorine, and wherein R" is, independently, a hydrocarbyl group having from one to about twenty carbon atoms.

7. A method of preparing a composition comprising combining individual components of:
a) aluminoxane source;
b) halogen source; and
c) Lewis base,
wherein said aluminoxane source is combined with said Lewis base before combining with said halogen source; and wherein said halogen source is:
(i) a halohydrocarbon of the formula $R_n CX_{4-n}$, wherein n=1-3, X is fluorine, and wherein R is, independently, a hydrogen atom or a hydrocarhyl group having from one to about twenty carbon atoms;
(ii) a halohydrocarbon of the formula: $ArG_n$, wherein Ar is an aromatic hydrocarbon ring system containing up to about 25 carbon atoms, G is $-CX_3$, $-CX_2R^1$, or $-CX(R^1)_2$, X is fluorine, $R^1$ is, independently, a hydrogen atom or $C_{1-4}$ alkyl group; and n is 1 to 5;
(iii) a siloxane having at least one hydrocarbyl groups containing from about 1 to 30 carbon atoms, wherein at least one of the hydrocarbyl groups contains at least one labile fluorine atom;
(iv) a silane of the formula $R'SiX_{4-n}$, wherein n=1-3, X is fluorine, and wherein R' is, independently, a hydrocarbyl group having from one to about twenty carbon atoms;
(v) a tin compound of the formula $R'SnX_{4-n}$, wherein n=1-3, X is fluorine, and wherein R' is, independently, a hydrocarbyl group having from one to about twenty carbon atoms; or
(vi) a hydrocarbyl aluminum halide of the formula $R''_m AlX_{3-m}$, wherein m=1 or 2, where X is fluorine, and wherein R" is, independently, a hydrocarbyl group having from one to about twenty carbon atoms.

8. The method of claim 7, wherein the Lewis base comprises (i) $NMeR^2_2$, and each $R^2$ is independently hydrogen atom or hydrocarbyl group having up to about 24 carbon atoms, or (ii) OMTS.

9. A method of preparing a composition comprising combining at least:
a) aluminoxane source comprising up to about 30 mol % halogen atoms relative to Al atoms; and
b) Lewis base,
wherein said halogen atoms in said aluminoxane source is provided by a halogen source, wherein said halogen source is:
(i) a halohydrocarbon of the formula $R_n CX_{4-n}$, wherein n=1-3, X is fluorine, and wherein R is, independently, a hydrogen atom or a hydrocarbyl group having from one to about twenty carbon atoms;
(ii) a halohydrocarbon of the formula: $ArG_n$, wherein Ar is an aromatic hydrocarbon ring system containing up to about 25 carbon atoms, G is $-CX_3$, $-CX_2R^1$, or $-CX(R^1)_2$, X is fluorine $R^1$ is, independently, a hydrogen atom or $C_{1-4}$ alkyl group; and n is 1 to 5;
(iii) a siloxane having at least one hydrocarbyl group containing from about 1 to 30 carbon atoms, wherein at least one of the hydrocarbyl groups contains at least one labile fluorine atom;
(iv) a silane of the formula $R'_n SiX_{4-n}$, wherein n=1-3, X is fluorine, and wherein R' is, independently, a hydrocarbyl group having from one to about twenty carbon atoms;
(v) a tin compound of the formula $R'_n SnX_{4-n}$, wherein n=1-3, X is fluorine, and wherein R' is, independently, a hydrocarbyl group having from one to about twenty carbon atoms; or
(vi) a hydrocarbyl aluminum halide of the formula $R''_m AlX_{3-m}$, wherein m=1 or 2, where X is fluorine, and wherein R" is, independently, a hydrocarbyl group having from one to about twenty carbon atoms.

10. A method of polymerizing monomer comprising combining composition of claim 1 transition metal component, and monomer.

11. The composition of claim 1, wherein the halogen source is alpha,alpha,alpha-trifluorotoluene, alpha,alpha-difluorotoluene or alpha-fluorotoluene.

12. The method of claim 7, wherein the halogen source is alpha,alpha,alpha-trifluorotoluene, alpha,alpha-difluorotoluene or alpha-fluorotoluene.

13. The method of claim 7, wherein the Lewis base comprises octamethyltrisiloxane.

14. A catalyst for olefin polymerization comprising the composition of claim 1 and a transition metal component.

15. The catalyst of claim 14, where the transition metal component has the formula $ML_aX_{n-a}$;

wherein M represents any metal atom from the lanthanide or actinide series or from the transition metals in Group 3 to 10 of the Periodic Table;

wherein L represents groups having ligands suitable for either Ziegler-Natta type catalyst precursor, or metallocene type catalyst precursor, or non-metallocene single-site catalyst precursor;

wherein X represents halogen, alkoxy, aryloxy, amide or hydrocarbyl group having 1 to about 20 carbon atoms;

and wherein a represents a numeral satisfying the expression $0 < a \leq n$; and n represents the valence of the metal atom M.

16. The composition of claim 15, wherein M is Ti, Zr, Hf, V, Nb, Cr, Mo, Fe, or Ni; and L is a metallocene type catalyst precursor or non-metallocene single-site catalyst precursor.

17. The composition of claim 6, wherein said aluminoxane source comprising up to about 30 mol % halogen atoms relative to Al atoms is fluorinated methylaluminoxane (F-MAO), fluorinated ethylaluminoxane (F-EAO), or fluorinated isobutylaluminoxane (F-IBAO).

18. A method of polymerizing a monomer comprising combining the composition of claim 6 with a transition metal component and a monomer.

19. A catalyst for olefin polymerization comprising the composition of claim 6 and a transition metal component.

* * * * *